US010767547B2

(12) United States Patent
Inoue et al.

(10) Patent No.: US 10,767,547 B2
(45) Date of Patent: Sep. 8, 2020

(54) THERMOSTAT DEVICE

(71) Applicant: NIPPON THERMOSTAT CO., LTD., Tokyo (JP)

(72) Inventors: Fujio Inoue, Tokyo (JP); Tetsuya Nishimura, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 64 days.

(21) Appl. No.: 16/097,619

(22) PCT Filed: Feb. 22, 2017

(86) PCT No.: PCT/JP2017/006509
§ 371 (c)(1),
(2) Date: Oct. 30, 2018

(87) PCT Pub. No.: WO2017/212692
PCT Pub. Date: Dec. 14, 2017

(65) Prior Publication Data

US 2019/0153927 A1 May 23, 2019

(30) Foreign Application Priority Data

Jun. 7, 2016 (JP) ................................ 2016-113806

(51) Int. Cl.
*F01P 7/16* (2006.01)
*G05D 23/185* (2006.01)
*G05D 23/02* (2006.01)

(52) U.S. Cl.
CPC ............ *F01P 7/165* (2013.01); *G05D 23/022* (2013.01); *G05D 23/1852* (2013.01); *F01P 7/16* (2013.01)

(58) Field of Classification Search
CPC . F16K 31/002; F16K 1/06; F16K 1/08; F16K 1/10; F16K 1/12; F01P 7/165; F01P 7/16; G05D 23/022; G05D 23/1852
See application file for complete search history.

(56) References Cited

U.S. PATENT DOCUMENTS 2,729,395 A * 1/1956 Watkins, Jr. ......... G05D 23/123 236/34
2,833,478 A * 5/1958 Middleton ......... G05D 23/1333 236/34

(Continued)

FOREIGN PATENT DOCUMENTS

JP S56171605 U 12/1981
JP H09-310939 A 12/1997

(Continued)

OTHER PUBLICATIONS

International Search Report (ISR) for Application No. PCT/JP2017/006509 dated Mar. 28, 2017.

(Continued)

*Primary Examiner* — Nelson J Nieves
(74) *Attorney, Agent, or Firm* — Isshiki International Law Office; Joseph P. Farrar, Esq.

(57) ABSTRACT

A thermostat device provided with a cylindrical boss protruding into a flow of fluid flowing in from a fluid inlet inside a device housing from a direction obstructing the flow of fluid, wherein a rectifying wall in the shape of a thin plate that protrudes toward an upstream side of the flow of fluid from the boss is provided as a rectifying means. The rectifying wall is formed in the shape of a plate that gradually increases in thickness from the fluid inlet side toward the boss. The leading edge along a direction of the flow of fluid is formed to have a tapered shape inclined from the tip of the boss toward the base of the boss. A side of the (Continued)

30 20 13 12 11 boss opposite the side facing the fluid inlet is provided with a rib.

3 Claims, 3 Drawing Sheets

(56) References Cited

U.S. PATENT DOCUMENTS 4,288,033 A 9/1981 Wisyanski
4,474,356 A * 10/1984 Baumann .................. F16K 1/34 251/122
4,524,907 A * 6/1985 Wong ................... G05D 23/022 236/100
5,163,613 A * 11/1992 Ragan ....................... F01P 7/16 236/34.5
5,292,064 A * 3/1994 Saur ..................... G05D 23/134 236/34.5
6,045,051 A * 4/2000 Ieda .......................... F01P 7/16 236/34
6,764,020 B1 * 7/2004 Zhao .................... G05D 23/022 123/41.1
7,987,822 B2 * 8/2011 Fishman ................. F01P 7/167 123/41.1
9,903,258 B1 * 2/2018 Tillman ............... G05D 23/022
2006/0245930 A1 * 11/2006 Heldberg .................. F01P 7/16 417/32
2010/0012738 A1 * 1/2010 Park .......................... F01P 7/16 236/101 C
2010/0326375 A1 * 12/2010 Furukoshi ................. F01P 7/16 123/41.09
2011/0095091 A1 4/2011 Suda et al.
2011/0198518 A1 * 8/2011 Habermann .......... F16K 31/002 251/11
2012/0319028 A1 * 12/2012 Kusakabe ........... F16K 27/0254 251/366
2013/0180477 A1 * 7/2013 Nakajima ............... F01P 7/167 123/41.05
2013/0200167 A1 * 8/2013 Auweder .................. F01P 7/16 236/93 R
2016/0208677 A1 * 7/2016 Boita ........................ F01P 7/16
2016/0356203 A1 12/2016 Kusakabe
2017/0268697 A1 * 9/2017 McCormick .............. F16K 1/12

FOREIGN PATENT DOCUMENTS

JP 2011231856 A 11/2011
JP 2013124618 A 6/2013
WO 2010004606 A1 1/2010

OTHER PUBLICATIONS

Translation of the ISR for Application No. PCT/JP2017/006509 dated Mar. 28, 2017.
Written Opinion of the International Search Authority for Application No. PCT/JP2017/006509 dated Mar. 28, 2017.

* cited by examiner

THERMOSTAT DEVICE

CROSS-REFERENCE TO RELATED APPLICATIONS

The present application is a national phase entry under 35 U.S.C. § 371 of International Application No. PCT/JP2017/006509, filed Feb. 22, 2017, which claims priority to Japanese Application No. 2016-113806, filed Jun. 7, 2016, the entire disclosures of each of which are hereby incorporated by reference herein.

BACKGROUND

Technical Field

The present invention relates to a thermostat device used for variably controlling fluid temperature in a coolant temperature control system for variably controlling the coolant temperature of an internal combustion engine (hereinafter referred to as an "engine") used in automobiles, and more particularly, to a thermostat device capable of reducing a loss of pressure caused by a boss protruding so as to block the flow of coolant inside the device housing.

Background Art

Conventionally, as thermostat devices of this type, those having various structures have been proposed. For example, a thermostat device disposed in a coolant system of an engine incorporates wax (a thermal expansion body) that expands and contracts by sensing the temperature change of the coolant flowing through the circulation flowpaths. Then, the thermostat device performs the opening and closing of the valve element by volumetric changes due to expansion and contraction of the wax to maintain the coolant at a predetermined temperature.

In this type of thermostat device, an electronically controlled piston heater type is known. That is, the thermostat device has a piston fixedly mounted to the interior of the device housing, but has a structure and a cylinder container that moves forward and backward with respect to the piston by encapsulating the thermal expansion body therewithin. The heater is provided inside the piston. Activating the heater and generating heat causes the wax to thermally expand irrespective of the coolant temperature so as to control the flow of the coolant. (See, for example, Patent Document 1).

This type of electronically controlled thermostat device typically has a structure in which a cylindrical boss protrudes into the interior of the device housing for external connection of the heater provided within the piston, and the base end of the piston is secured to this cylindrical boss.

PRIOR ART DOCUMENTS

Patent Documents

Patent Document 1: WO 2010/004606

Patent Document 2: Japanese Patent Application Publication No. 2013-124618

SUMMARY OF THE INVENTION

Technical Problem

However, in the structure of Patent Document 1 described above, coolant flowing from the radiator side collides with the boss protruding into the interior of the device housing, causing turbulence that increases the flow resistance in the thermostat device and leading to a large loss of pressure in the coolant flowpath. When such a loss of pressure increases, there is also a problem that the size of the water pump of the coolant system is also increased and design freedom is impaired.

Further, in the structure of Patent Document 1 described above, because the external connector protrudes to a considerable extent outside the device housing, it is difficult to make the device compact.

Further, in the thermostat device described above, in addition to the boss the fluid flow strikes the piston as well directly (with excessive pressure), causing the piston to shake and interfering with the smooth operation of the thermo-element, so that the main valve tilts and does not seal properly.

Further, the boss described above tends to be in a colliding position (weld) of the resin material flowing into the mold when the housing is being molded, so there is also a problem that the resin tends to be weakened.

As disclosed in Patent Document 2, there is also known a structure in which a cylindrical boss for securing the base end of the piston is adopted to protrude outside the device housing. However, in such a structure, the device tends to become large due to the existence of the boss protruding outside the housing.

Moreover, in order to provide the boss on the outside of the housing, there are restrictions on the length of the heater, the overall length of the piston cannot be freely changed, and the heater connector protrudes to the outside of the housing in the same manner as described above, thus tending to invite formation of a large thermostat device.

The present invention is conceived in light of the above-described circumstances, and has as its object to obtain a thermostat device provided with a rectifying means on an upstream side of a boss used to insert and secure a piston that projects into the interior of a device housing, such that the flow of fluid into the interior of the device housing avoids the boss and flows smoothly toward the main valve, so that the thermostat device can thereby promote a smooth flow of a fluid and provide a rectifying effect, reducing loss of pressure inside the fluid passages.

Further, by providing a rectifying means on the inlet side of the boss protruding into the interior of the device housing together with a rib provided on the opposite side of the boss, the present invention has as its object to minimize molding defects arising when forming the boss of the housing and obtain a smaller, more compact thermostat device.

Solution to the Technical Problem

To achieve such an object, the thermostat device according to the present invention is a thermostat device provided with a cylindrical boss protruding into a flow of fluid flowing in from a fluid inlet inside a device housing from a direction obstructing the flow of fluid, wherein a portion of an outer peripheral surface of the boss that faces the fluid inlet is provided with a rectifying means.

In the thermostat device according to the present invention, the rectifying means is a rectifying wall formed in the shape of a thin plate that protrudes toward an upstream side of the flow of fluid from the portion of the outer peripheral surface of the boss that faces the fluid inlet.

In the thermostat device according to the present invention, the rectifying wall has a leading edge along a direction of the flow of fluid formed to have a tapered shape inclined from the tip of the boss toward the base of the boss.

In the thermostat device according to the present invention, the rectifying wall is formed in the shape of a plate that gradually increases in thickness from the fluid inlet side toward the boss.

In thermostat device according to the present invention, a side of the boss opposite the side facing the fluid inlet is provided with a rib.

Effect of the Invention

As described above, by providing the rectifying wall, which extends in the upstream direction of the flow of fluid inside the device housing and acts as a rectifying means that divides the flow of fluid in two, on the outer peripheral surface of the boss that protrudes into the interior of the device housing, the thermostat device according to the present invention can prevent turbulence caused by the presence of the boss protruding into the interior of the housing, provide a rectifying effect, and reduce loss of pressure despite its simple structure.

Also, by configuring the thermostat device so as to provide a rib on the opposite side of the boss in addition to the rectifying portion provided on the upstream side (inlet side) of the boss, the present invention can minimize molding defects generated during molding and eliminate defects like those of the prior art.

That is, providing just the rectifying wall on the upstream side of the boss might cause the boss to tilt due to resin shrinkage during cooling of the rectifying wall after formation and de-center the boss opening, making it impossible to insert the heater into the piston. Alternatively, since the thermo-element does not operate properly, operating the main valve element in a tilted state may cause problems such as degradation of the seal and an increase in fluid leakage.

Further, in a case in which only the rectifying means is provided as described above, even if the thermo-element and the main valve can operate without tilting, the piston is inclined so that the sealing of the opening in the U-packing seal in the thermo-element becomes inadequate, or may induce uneven wear of the opening, resulting in fluid entering the thermo-element and leading to failure of the thermo-element.

In contrast, a rib is provided at an axisymmetric position with respect to the rectifying means with the boss interposed therebetween, so the present invention can prevent weakening due to the occurrence of a weld at the boss, eliminating the problems of axial misalignment and inadequate sealing.

Further, since there is no portion protruding to the outside of the device housing, the present invention can make the entire device more compact.

Moreover, the leading edge of the rectifying wall along the direction of fluid flow is formed to have a tapered shape inclined from the tip of the boss toward the base of the boss, in the shape of a plate that gradually becomes thicker from the fluid inlet side to the boss, so the present invention can provide even more of the above-described rectifying effect and promise a sharp reduction in loss of pressure.

DETAILED DESCRIPTION OF EMBODIMENTS

First Embodiment

Figure 1:
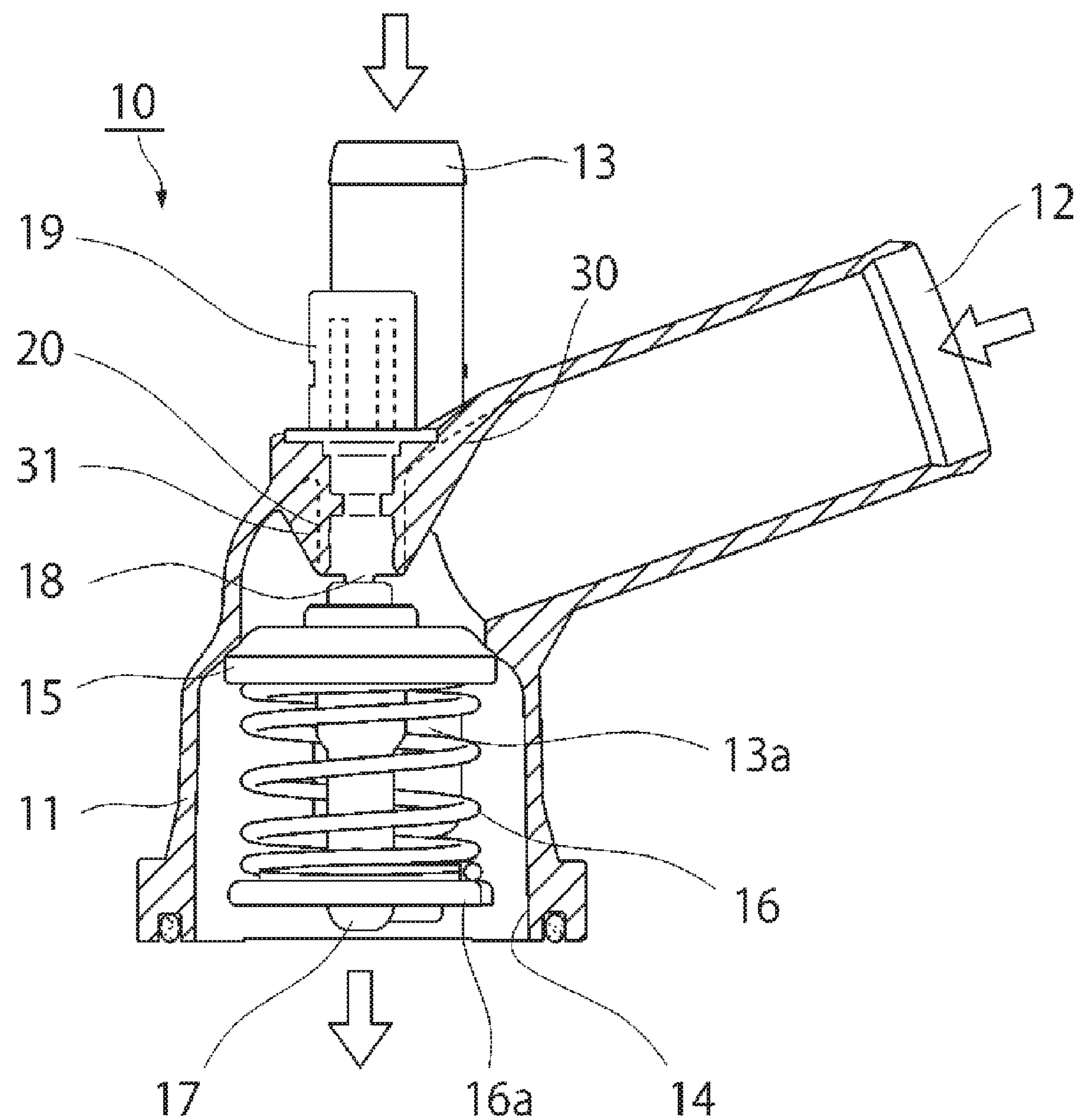
FIG. 1 illustrates an embodiment of a thermostat device according to the present invention, and is a cross-sectional view of a main part for describing a schematic configuration of the whole device.
Figure 2:
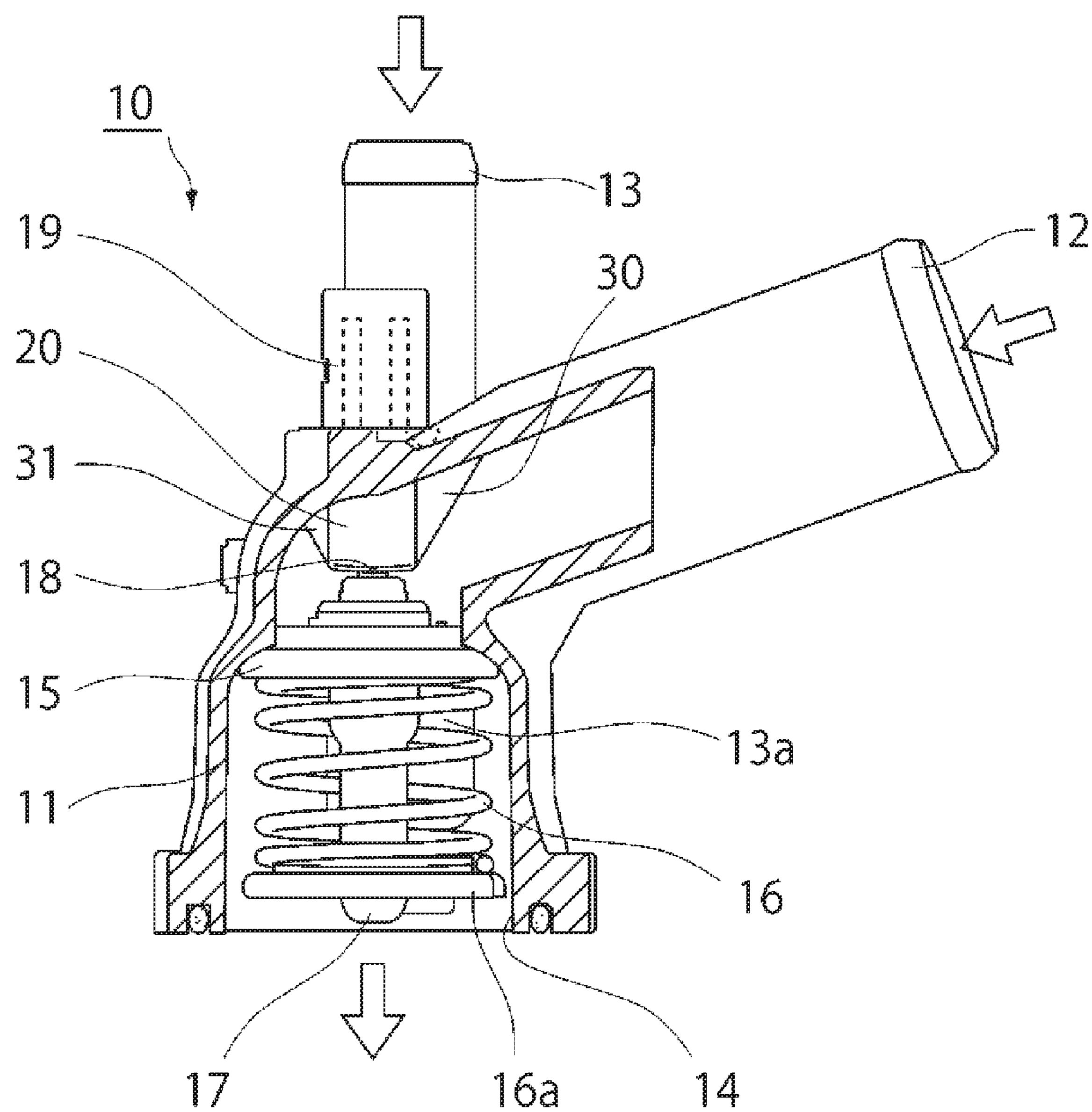
FIG. 2 is a cross-sectional view of a main part illustrating a cross-section at another position of the thermostat device of FIG. 1.
Figure 3:
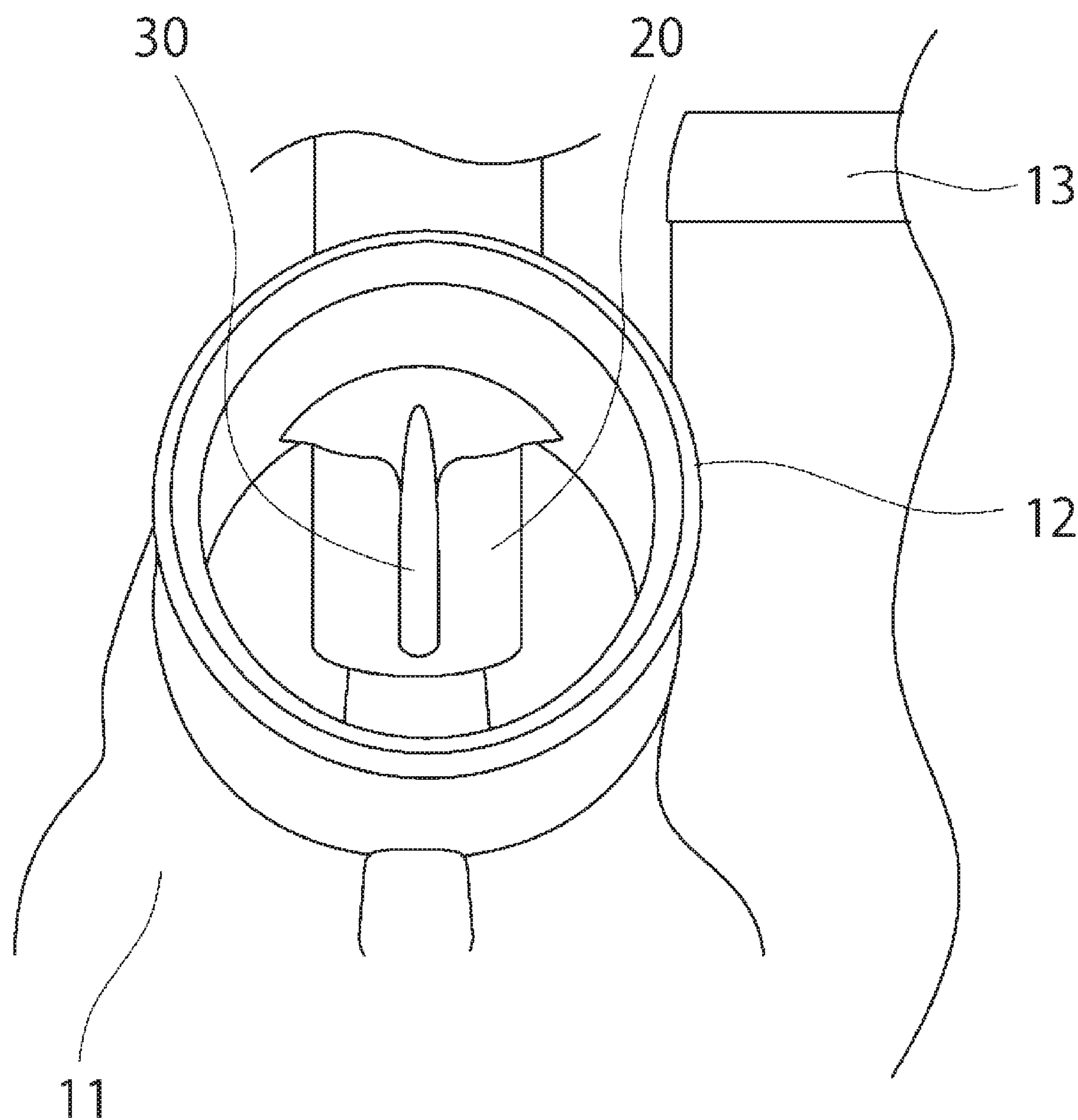
FIG. 3 illustrates an embodiment of a thermostat device according to the present invention

FIGS. 1 to 3 illustrate an embodiment of a thermostat device according to the present invention.

In these figures, what is denoted by reference numeral 10 in its entirety is an electronically controlled thermostat device, which is provided, for example, in the coolant system of an engine, installed at the intersection of the radiator side coolant passage and the bypass passage from the engine outlet side, such that, by selectively switching the flow of the coolant in the first and second fluid flowpaths constituted by these passages, the thermostat device is used to control the coolant temperature up to the engine inlet portion.

The thermostat device 10 includes a substantially bottomed cylindrical piston 18 that is secured to a cylindrical boss 20 (to be described later) inside the device housing 11 and is suspended therewithin, and a thermo-element 17 fitted around the exterior of the piston 18 so as to be slidable in the axial direction. A main valve element 15 that controls the opening and closing of the fluid passages formed within the device housing 11 is provided to the upper part of the thermo-element 17 in the axial direction.

As is well known in the art, a thermal expansion material such as wax is sealed inside the thermo-element 17. The tip of the piston 18 is disposed facing the interior of the thermal expansion body and a heater (not shown in the drawing) is provided inside the piston 18, and is thus configured to enable temp control.

In this electronically controlled thermostat device 10, a spring 16 that biases the main valve element 15 and a spring seat **16*a*** are provided, together with a second valve element that becomes a bypass valve and a bypass spring. These configurations are well known in the art and a detailed illustration and explanation are omitted here.

In the figure, reference numeral 12 denotes a fluid inlet for coolant from the radiator, 13 denotes a fluid inlet on the bypass circuit side, **13*a* denotes an inflow portion from the fluid inlet on the bypass circuit side to the downstream side of the main valve element 15, and 14 denotes an opening for the passage leading to the engine intake. Reference numeral 19 denotes a connector for externally connecting the heater provided in the piston 18**.

According to the present invention, in the thermostat device 10 having the above-described configuration, a rectifying wall 30 in the shape of a thin plate is provided as a rectifying means in a portion of the outer circumferential surface of the cylindrical boss 20 and protrudes so as to face the inside of the fluid inlet 12 side in a direction that blocks the flow of the fluid (coolant) flowing in from the fluid inlet 12 in the device housing 11, that is, from a direction orthogonal to the flow of fluid.

Here, the rectifying wall 30 in the shape of a thin plate extends from the portion on the outer peripheral surface of the cylindrical boss 20 that faces the fluid inlet 12 toward the upstream side of the fluid flow.

That is, by providing the rectifying wall 30, which extends in the upstream direction of the flow of fluid inside the device housing 11 and acts as a rectifying means that divides the flow of fluid in two, on the outer peripheral surface of the boss 20 that protrudes into the interior of the device housing 11, a loss of pressure can be reduced by preventing the occurrence of a collision, turbulence or the like due to the existence of the boss 20 protruding into the housing 11, and thereby providing a rectifying effect.

As illustrated in FIG. 1, a leading edge of the rectifying wall 30 along the direction of fluid flow is formed to have a tapered shape inclined from the tip of the boss to the base, and this tapered shape is configured so as to cause the flow of fluid from the fluid inlet 12 to flow smoothly toward the opening and closing portion created by the main valve element 15. In this way, the fluid from the fluid inlet 12 flows smoothly, without colliding with the boss 20, and turbulence does not occur, so that the loss of pressure can be reduced.

As illustrated in FIG. 3, the rectifying wall 30 is formed in a plate shape that gradually becomes thicker from the fluid inlet 12 side to the boss 20. In this way, the fluid flowing from the fluid inlet 12 is divided at the tip edge portion of the rectifying wall 30 and moreover flows smoothly along the tapered surface created as the thickness of the rectifying wall 30 increases, thereby providing even more of the rectifying effect described above and reducing loss of pressure.

Further, as illustrated in FIG. 1 and FIG. 2, according to the present invention a rib 31 is provided to the boss 20 on the inside of the device housing 11 on a portion of the boss 20 opposite the side on which the fluid flows in, that is, at a position axially symmetrical to the rectifying wall 30. As a result, it is possible to suppress molding defects occurring when the boss 20 of the housing 11 is molded, and it is possible to eliminate defects that have been a problem in the past.

That is, providing just the rectifying wall 30 on the upstream side of the boss 20 might cause the boss 20 to tilt due to resin shrinkage during cooling of the rectifying wall 30 after formation and thereby de-center the boss 20 opening, making it impossible to insert the heater into the piston 18. In that case, since the thermo-element 17 does not operate properly, operating the main valve element 15 in a tilted state may cause a problem such as degradation of the seal and an increase in fluid leakage.

Further, in a case in which only the rectifying wall 30 is provided as described above, even if the thermo-element 17 and the main valve element 15 can operate without tilting, the sealing of the opening in the boss 20 by the U-packing seal inside the thermo-element 17 becomes inadequate and fluid enters the thermo-element 17, possibly leading to failure of the thermo-element 17.

In contrast, if the rectifying wall and the rib 31 are provided on axially symmetrically opposite sides of the boss 20 as described above, it is possible to prevent weakening due to the occurrence of a weld in the boss, eliminating the problems of axial misalignment and inadequate sealing.

According to the thermostat device 10 configured as described above, when molding the device housing 11 it is possible to easily form the rectifying wall 30 and the rib 31 on the fluid inlet 12 side of the cylindrical boss 20 and at an position axially symmetrical to the fluid inlet 12 side together with the device housing 11, and with this simple structure obtain a proper and smooth flow of fluid within the device housing 11, preventing collision with the boss 30 and consequent turbulence as in the past, providing the rectifying effect, and reducing loss of pressure.

The functional effect of this type of rectifying wall 30, confirmed by experiment, is to divide the fluid flowing in from the fluid inlet 12 as it flows toward the cylindrical boss 20 with the leading edge portion of rectifying wall 30 and cause it to flow smoothly along the tapered surfaces on both sides of the rectifying wall 30 and toward the valve created by the main valve element 15, without creation of a reservoir of useless fluid, while preventing the occurrence of turbulence.

In addition, since the rib 31 is provided on the side opposite the fluid inlet 12 of the cylindrical boss 20 and does not obstruct the flow of fluid, experiments confirm that it poses no problem for the functioning of the thermostat device 10. So long as it provides the effects of the present invention, the rib 31 may be any shape.

It should be noted that the present invention is not limited to the structure described in the above embodiment, and the shape, structure, etc., of each part constituting the thermostat device 10 can be suitably modified and varied as appropriate.

Although in the above-described embodiment the thermostat device 10 has been described as an electronically controlled thermostat device of the piston heater type, the present invention is not limited thereto but is applicable to thermostat devices formed as a single unit with the housing and not electronically controlled, and can reduce loss of pressure at the boss that is the weak point of the poppet valve-type of thermostat.

DESCRIPTION OF REFERENCE CHARACTERS

10 Electronically controlled thermostat device
11 Device housing
12 Fluid inlet
13 Fluid outlet
14 Exit opening
15 First valve element
16 Spring
17 Thermo-element
18 Piston
19 External connector
20 Cylindrical boss
30 Rectifying wall (rectifying means)
31 Rib

What is claimed is:

1. A thermostat device comprising:

a thermostat device housing having a fluid inlet therein;

a cylindrical boss disposed inside the thermostat device housing and protruding vertically downward into an interior of the thermostat device housing and into a flow of fluid flowing in from the fluid inlet; and a rectifying wall provided to a portion of an outer peripheral surface of the cylindrical boss that faces the fluid inlet, wherein the rectifying wall is a thin plate that protrudes toward the fluid inlet and upstream into the flow of fluid, and has a leading edge along a direction of the flow of fluid formed to have a tapered shape inclined from a tip of the boss toward a base of the boss.

2. The thermostat device according to claim 1, wherein the rectifying wall gradually increases in thickness from the fluid inlet side toward the boss.

3. The thermostat device according to claim 1, wherein a rib is provided to a side of the boss opposite the side facing the fluid inlet, at a position axisymmetric with respect to the rectifying wall.

* * * * *